W. B. MARTIN.
OVEN SHELF.
APPLICATION FILED FEB. 11, 1919.

1,351,394.

Patented Aug. 31, 1920.
2 SHEETS—SHEET 1.

Inventor
W. B. Martin

By D. Swift & Co.
His Attorneys

W. B. MARTIN.
OVEN SHELF.
APPLICATION FILED FEB. 11, 1919.
1,351,394.
Patented Aug. 31, 1920.
2 SHEETS—SHEET 2.
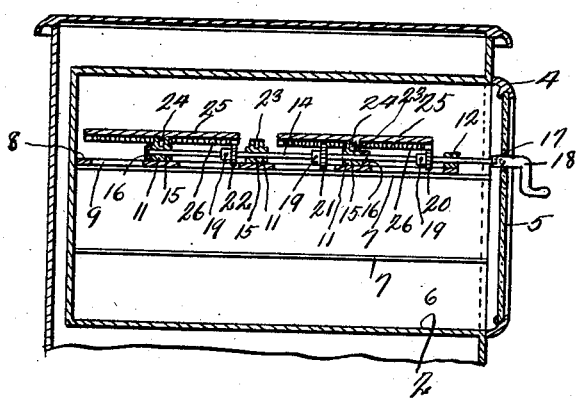
Fig. 4.
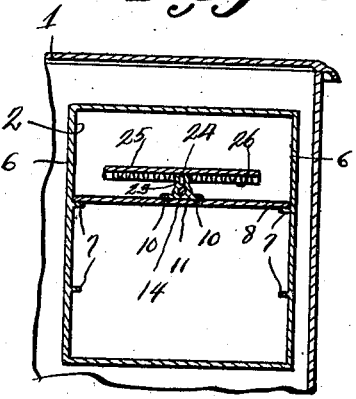
Fig. 5.
Fig. 6.
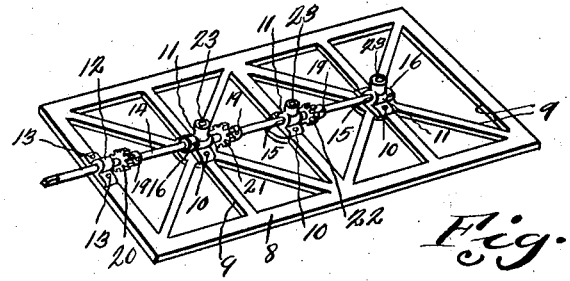
Fig. 7.
W. B. Martin, Inventor
By D. Swift & Co.
His Attorneys

UNITED STATES PATENT OFFICE.

WILLIAM BAIRD MARTIN, OF BELOIT, WISCONSIN.

OVEN-SHELF.

1,351,394.
Specification of Letters Patent.
Patented Aug. 31, 1920.

Application filed February 11, 1919. Serial No. 276,251.

*To all whom it may concern:*

Be it known that I, WILLIAM BAIRD MARTIN, a citizen of the United States, residing at Beloit, in the county of Rock, State of Wisconsin, have invented a new and useful Oven-Shelf; and I do hereby declare the following to be a full, clear, and exact description of the invention, such as will enable others skilled in the art to which it appertains to make and use the same.

The invention relates to oven shelves and has for its object to provide a shelf wherein, the necessity of turning the article being baked around in the oven by hand, which operation often results in the burning of the hands, is eliminated. When baking cakes it is particularly necessary to turn the cake in the oven, otherwise the same will not be evenly baked nor will it be of a uniform brown.

A further object of the invention is to provide one or more revolving disks, having gear connections with gears revolved by a shaft, said shaft being provided with a detachable handle located outside the door of the oven whereby the shaft may be revolved, thereby revolving the baking disks.

A further object is to so construct the mechanism for turning the disks that disks of different sizes may be used, or if desired one disk may be used. Also to so construct the mechanism for turning the disks, that when it is desired to eliminate the use of disks, it will only be necessary to turn the shelf over thereby presenting a surface which may be used for vessels for cooking.

With the above and other objects in view, the invention resides in the combination and arrangement of parts as hereinafter set forth, shown in the drawings and claimed, it being understood that changes in the precise embodiment of the invention may be made within the scope of what is claimed without departing from the spirit of the invention.

In the drawings:—

Fig. 4 is a sectional view taken on line 4—4 of Fig. 2.

Fig. 5 is a sectional view taken on line 5—5 of Fig. 2.

Fig. 6 is a sectional view taken on line 6—6 of Fig. 3.

Fig. 7 is a perspective view of the shelf.

Figure 1:
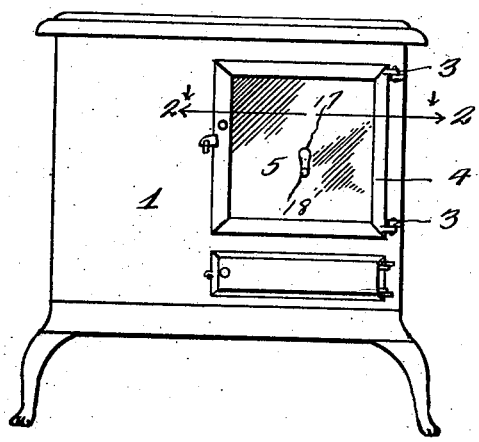
Figure 1 is a front elevation of a stove, showing the glass oven door.

Referring to the drawings the numeral 1 designates a conventional form of stove, which may be a coal, oil or gas burning stove. The oven 2 is of the usual construction, that is oblong in shape. Hingedly connected as at 3, to the open end of the oven is a conventional form of oven door 4. This door is provided with a glass or transparent panel 5, through which the articles that are being cooked or baked within the oven, may be seen at all times.

The side walls 6 of the oven are provided with the usual shelf guides 7, which are so arranged as to receive and support the removable shelf 8, said shelf being provided with openings 9, through which the hot air passes, thereby allowing a uniform temperature as far as possible throughout the oven chamber. It is to be understood that one or more shelves may be used, but for purposes of illustration only one shelf is shown and described.

Secured to the shelf by means of rivets 10 is a series of alined castings 11, said castings being located substantially centrally of the shelf. A bearing 12 is secured to the front end of the shelf by means of rivets 13, a rotatable shaft 14 being mounted in the bearings 12 and bearings 15 of the castings 11, there being collars 16 pinned to the shaft whereby longitudinal movement of the shaft is prevented. One end of the shaft terminates in registration with an aperture 17 in the glass door, said shaft being adapted to be rotated by means of an operating handle 18 located outside of the door. Adjustably secured to the shaft 14, by means of set screws 19 are gears 20, 21 and 22 which revolve with the shaft 14.

Figure 3:
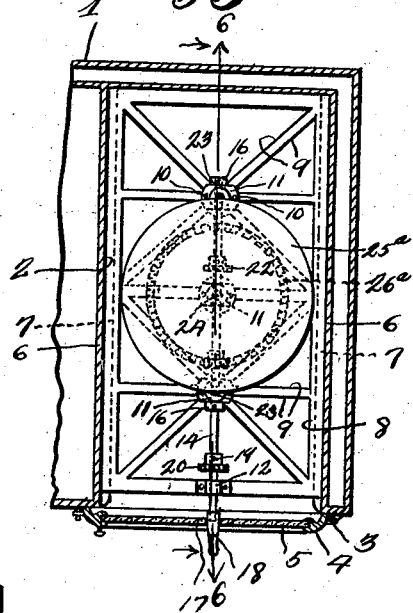
Fig. 3 is a sectional view similar to Fig. 2, but showing the use of one disk.
Figure 2:
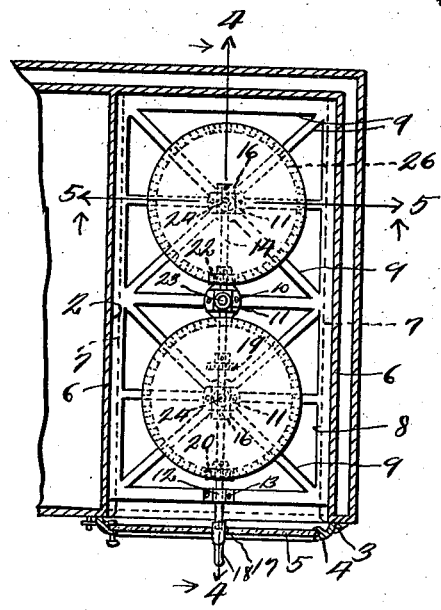
Fig. 2 is a sectional view taken on line 2—2 of Fig. 1.

Each casting 11 is provided with a bearing 23, in which the pins 24 of the plates 25 revolve, said bearings 23 being in vertical alinement with the shaft 14. The plates are on their lower surfaces provided with circumferentially arranged gear teeth 26, which mesh with the gears 20 and 22. However when it is desired to use a larger plate 25$^a$, the small plates are removed and the larger plate is placed on the shelf. In this case the gear teeth 26$^a$ of the plate 25$^a$ will mesh with the gear 21 as shown in Figs. 3 and 6.

After the shelf has been placed in the oven and the plates are in position, the cake or other article is placed on the plate and the door closed. The cook is able to observe the baking of the cake through the transparent door of the oven. When it is desired to turn the cake, the door of the oven is not opened but the handle 18 is passed through the aperture 17 in the glass of the oven door and engages the end of the shaft, then the cook grasps the handle 18 and imparts a revoluble movement to the same, this action revolving the shaft 14 and gears thereon. The gears being in mesh with the gear teeth on the plates, consequently revolve the same, which in turn revolve the cake. When the cake has been turned far enough the handle 18 may be removed or left in position for further operation. The turning operation is repeated until the cake is uniformly baked and browned. From the above it will be seen that the opening of the oven door is eliminated and also the touching of the baking pan is eliminated, which often burns the hands.

It will also be seen that by removing the plates and then turning the shelf over, that the necessity of providing two types of shelves is eliminated.

The invention having been set forth, what is claimed as new and useful is:—

An oven shelf comprising a body member adapted to be supported in an oven, said shelf being provided with a pair of spaced bearings, a shaft rotatably mounted in said bearings adjacent the upper face of the shelf, gears adjustably secured to the shaft, said bearings being provided with sockets located above the shaft, said sockets being adapted to receive pintles of article supporting plates, said adjustable gears being adapted to mesh with gears carried by the article supporting plates and means whereby the shaft may be rotated for simultaneously rotating the article supporting plates.

In testimony whereof I have signed my name to this specification in the presence of two subscribing witnesses.

WILLIAM BAIRD MARTIN.

Witnesses:
F. A. REUSCHLE,
V. J. TRUESDELL.